United States Patent [19]

Brock

[11] Patent Number: 5,757,542
[45] Date of Patent: May 26, 1998

[54] POLARIZING ACCESSORY SYSTEM FOR MICROSCOPES

[76] Inventor: Dennis Brock, 1430 Pelican Bay Trail, Winter Park, Fla. 32792

[21] Appl. No.: 719,813

[22] Filed: Sep. 25, 1996

[51] Int. Cl.[6] .......................... G02B 21/06; G02B 21/00
[52] U.S. Cl. .................. 359/390; 359/368; 359/271; 359/386
[58] Field of Search ........................ 359/368–372, 359/385–387, 391–398

[56] References Cited

U.S. PATENT DOCUMENTS

| | | | |
|---|---|---|---|
| 2,078,184 | 4/1937 | Land | 359/386 |
| 2,079,621 | 5/1937 | Land | 359/386 |
| 4,226,534 | 10/1980 | Kuck | 359/386 |
| 4,255,014 | 3/1981 | Ellis | 359/371 |
| 4,386,830 | 6/1983 | Stankewitz et al. | 359/386 |
| 4,512,640 | 4/1985 | Nihoshi | 359/371 |
| 4,812,029 | 3/1989 | Onanhian | 359/390 |
| 4,836,667 | 6/1989 | Ozeki | 359/396 |
| 5,044,022 | 9/1991 | Blais et al. | 29/834 |
| 5,071,241 | 12/1991 | Brock | 359/390 |
| 5,260,827 | 11/1993 | Dziekan | 359/493 |
| 5,495,676 | 3/1996 | Chesnut et al. | 359/311 |

*Primary Examiner*—Thong Nguyen
*Attorney, Agent, or Firm*—Caesar, Rivise, Bernstein, Cohen & Pokotilow, Ltd.

[57] ABSTRACT

A polarizing accessory system for use with a microscope. The microscope comprises an optical tube having a eye-piece lens and an objective lens, a stage having an aperture therein, and a light conveying rod arranged to covey light through the aperture to the objective lens and the eye-piece lens. The accessory system comprises a first, tray-like polarizing unit arranged to be disposed on the microscope stage over the aperture, and a second, cup-shaped polarizing unit arranged to be releasably mounted over the eye-piece lens. Each polarizing unit includes a planar polarizing filter or film mounted therein. The tray-like unit comprises a peripheral planar frame defining a central window in which a first polarizing filter element is located. The central window forms a support surface for two, conventional specimen-holding slides disposed in a side-by-side array. The width of the window is equal to the width of the slides to hold them securely in place thereon. The tray enables the slides to be positioned at any place on the surface of the microscope's stage. The cup-shaped polarizing unit is rotatable with respect to the optical tube (and the tray-like polarizing unit disposed on the stage) so that one can readily adjust the amount of light polarization desired.

5 Claims, 2 Drawing Sheets

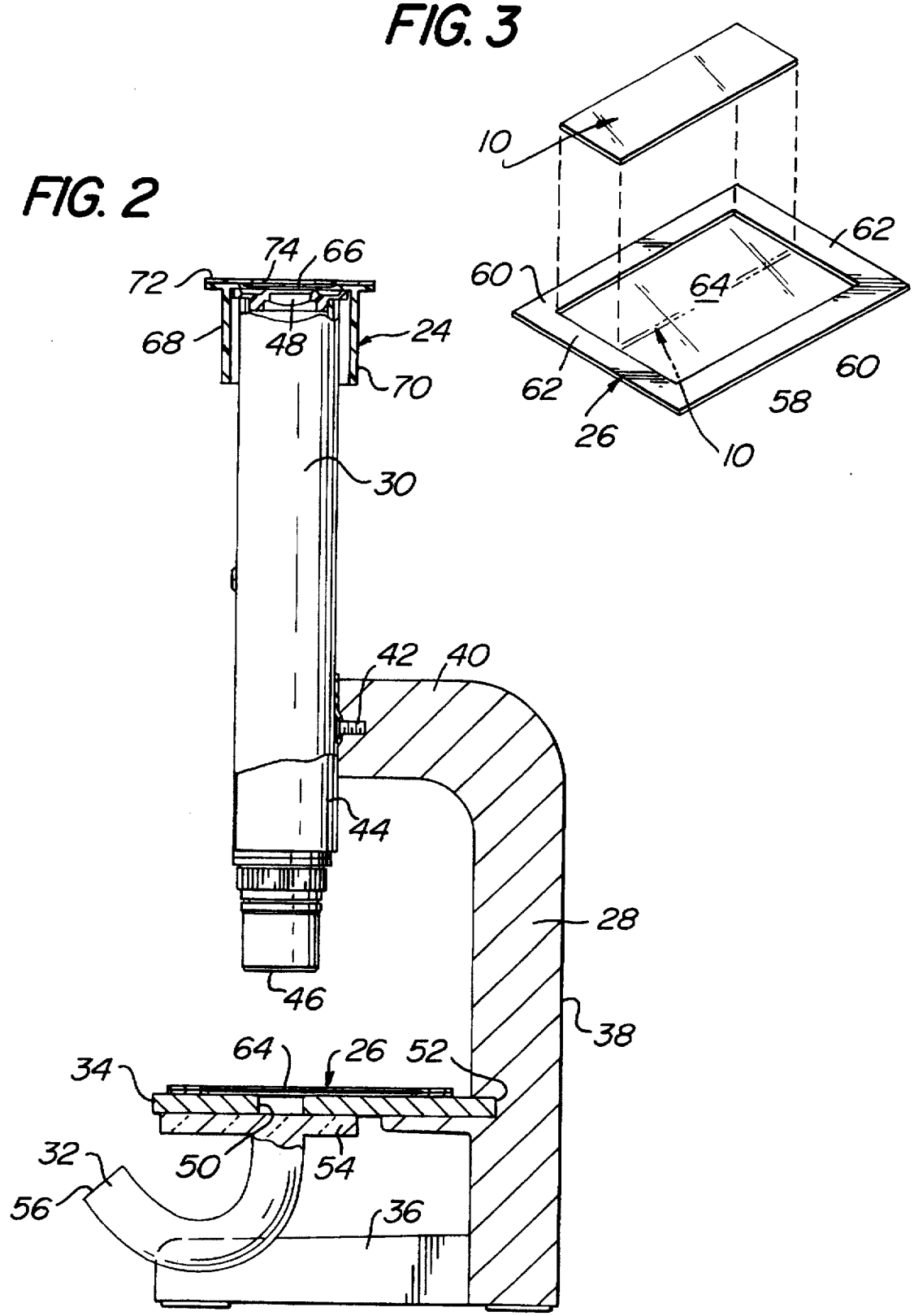

POLARIZING ACCESSORY SYSTEM FOR MICROSCOPES

BACKGROUND OF THE INVENTION

This invention relates generally to microscopes, and more particularly to polarizing accessories therefor.

Numerous laboratory microscopes or other sophisticated optical instruments including light polarizing systems are commercially available and some are disclosed in the patent literature. Examples of such patented optical instruments are as follows: U.S. Pat. Nos. 4,255,014 (Ellis), 4,386,830 (Stankewitz et al.), 4,512,640 (Nihoshi), 4,812,029 (Onanhian), and 5,044,072 (Blais et al.).

While the aforementioned instruments are suitable for their intended purposes, they leave much to be desired from the standpoint of suitability for use by young students or children. In this regard, owing to the budgetary constraints of most schools sophisticated, complex, laboratory-quality instruments, like those disclosed above, are not generally used in classroom settings. Another factor limiting the use of sophisticated microscopes by young students is their inability to readily operate the instrument. Moreover, rough handling of the instrument may be expected, particularly with very young children.

Accordingly, for typical classroom use by young children, low cost, simple, rugged and easy-to-use microscopes are desirable. One such microscope is that sold under the trademark MAGISCOPE and is disclosed in my earlier U.S. Pat. No. 5,071,241, whose disclosure is incorporated by reference herein.

While the MAGISCOPE is suitable for its intended purposes it leaves something to be desired from the standpoint of providing enhanced viewing of some materials, e.g., crystals, etc., which are best viewed using polarized light.

OBJECTS OF THE INVENTION

Accordingly, it is a general object of this invention to provide a polarizing accessory system for use with my aforementioned microscope, or any suitable microscope, and which overcomes the disadvantages of the prior art.

It is another object of this invention to provide a polarizing accessory system for use with simple optical microscopes and which system is simple in construction.

It is another object of this invention to provide a low-cost polarizing accessory system for use with simple optical microscopes.

It is another object of this invention to provide an easy-to-use polarizing accessory system for use with simple optical microscopes.

It is still another object of this invention to provide a polarizing accessory system which can be readily mounted on and dismounted from a simple optical microscope.

It is yet another object of this invention to provide a polarizing accessory system for microscopes which includes means particularly suited to serve as a support or holder for at least one conventional specimen-bearing microscope slide.

SUMMARY OF THE INVENTION

These and other objects of this invention are achieved by providing a polarizing accessory system for use with a microscope. The microscope comprises an optical tube having a eye-piece lens and an objective lens, a stage having an aperture therein, and a light conveying means arranged to convey light through the aperture to the objective lens and the eye-piece lens.

The accessory system basically comprises a first polarizing unit arranged to be disposed on the microscope stage over the aperture, and a second polarizing unit arranged to be releasably mounted over the eye-piece lens and movable with respect thereto. The second polarizing unit is in the form of cup-shaped body having a polarizing filter element mounted therein. The first polarizing unit comprises a peripheral, planar frame defining a central window therein in which a polarizing filter element is located. The central window forms a support surface for at least one conventional, specimen-holding slide, with the width of the window being equal to the width of the slide.

DESCRIPTION OF THE DRAWINGS

Other objects and many attendant features of this invention will become readily appreciated as the same becomes better understood by reference to the following detailed description when considered in connection with the accompanying drawings wherein:

FIG. 2 is a slightly reduced partial sectional view taken along line 2—2 of FIG. 1; and FIG. 3 is an exploded perspective view of a portion of the polarizing accessory system shown in FIG. 1 for supporting up to two conventional specimen-bearing slides thereon.

DETAILED DESCRIPTION OF THE PREFERRED EMBODIMENTS

Figure 1:
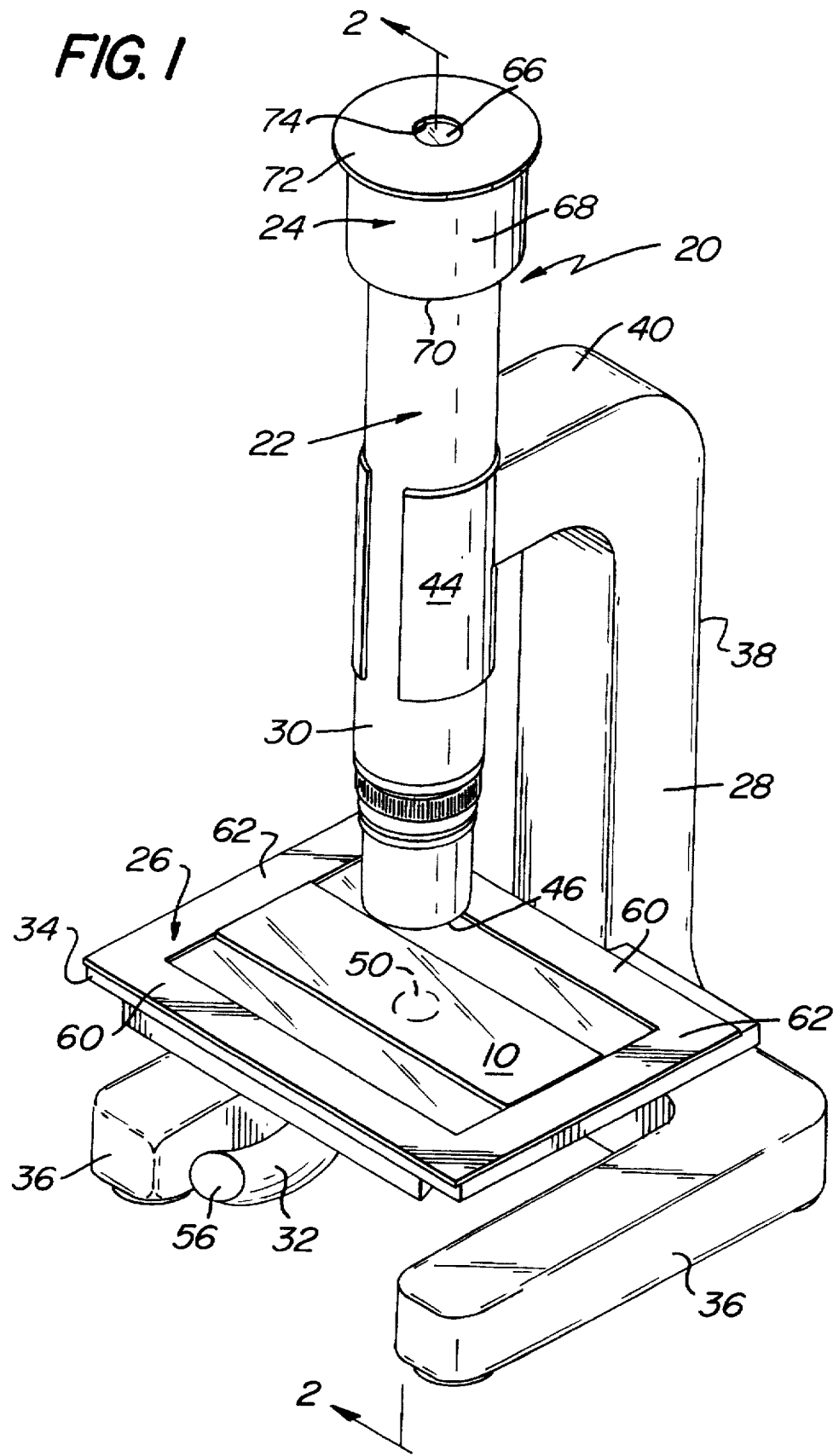
FIG. 1 is an isometric view of a polarizing accessory system constructed in accordance with this invention and shown disposed on my prior art MAGISCOPE microscope.

Referring now to various figures of the drawing where like reference numerals refer to like parts there is shown at 20 in FIG. 1 a polarizing accessory system constructed in accordance with this invention for use with any type of simple optical microscope 22, such as my heretofore identified MAGISCOPE microscope.

The polarizing accessory system 20 basically comprises a first polarizing unit 24 and a second polarizing unit 26. The units 24 and 26 are arranged to be readily mounted on (and when desired, taken off) the microscope 22.

The details of the polarizing system 20 will best be understood after a description of the microscope on which the system is to be used. Accordingly, the microscope 22 will now be described. Thus, as can be seen in FIGS. 1 and 2, the microscope 22 is constructed in accordance with the teachings of my U.S. Pat. No. 5,071,241 and basically comprises a support or stand 28, an optical tube 30, an illuminating light transmissive rod 32 (FIGS. 1 and 3), and a specimen-supporting stage 34. The stand 28 comprises a lower, horizontal leg section 36, an upstanding vertical arm 38, and an in-turned upper leg section 40. The upper leg section is secured at its free end via a screw 42 to a resilient, cylindrical split sleeve 44. The sleeve 44 is arranged for slidably supporting the optical tube 30 therein, with the friction therebetween being sufficient to maintain the optical tube in any of its various adjusted positions, so that the optical elements, i.e., lenses (to be described hereinafter), within tube can be brought into focus on any specimen, e.g., a conventional glass specimen-bearing slide 10, located on the stage.

As best seen in FIG. 2 the optic tube 30 includes an objective lens assembly 46 having at least one objective lens mounted at the lower end of the optic tube, and an eyepiece lens assembly 48 having at least one eyepiece lens mounted at the upper end of the optic tube. The specimen-holding stage 34 is a generally planar member having an aperture 50 therein. The stage is bonded or frictionally secured within a slot or groove 52 in the vertical arm 38.

The light transmissive rod 32 is in the form of a transparent, clear, curved acrylic member attached at one end thereof within a passageway (not shown) of a clear, flat, acrylic plate 54 (FIG. 2), by a suitable solvent binder. The passageway is aligned with the aperture 50 in the microscope's stage 34. The end of the rod is located close to the aperture and is planar. The opposite or free end 56 of the rod 32 is also planar and serves as the ambient light receiving portion of the rod 32. As can be seen in FIG. 2 the free end 56 of the rod 32 is located so that it is below the microscope's stage 34 and directed at an acute angle, e.g., 50 degrees, from the horizontal, upward to gather ambient light from above and carry it through the aperture in the microscope stage to illuminate any specimen disposed over the aperture. The plate 54 is preferably formed of a transparent, clear acrylic whose edges are polished so that it gathers ambient light and conveys the light to the rod 32, which in turn conveys the light to the aperture 40. The light gathering ability of the rod and associated plate is such as to enable sufficient illumination to permit high magnification, e.g., 400× and possibly greater, suitable for use in an educational environment.

Preferably the light gathering free end surface 56 is matted or roughened by sanding it with a 320 grit sandpaper. This provides for more even illumination of the specimen in environments having uneven or other lighting anomalies, such as frequently occurs in exhibition halls using high intensity lighting, such as halogen, sodium vapor, metal halide, etc. Conventional fluorescent lighting typically is free of such anomalies and hence microscopes for use in such conditions may use a light transmissive rod with a polished light gathering end surface 56. The end of the rod 32 which is attached to the plate 54 is preferably matted to diffuse or even out the light transmitted through the rod 32 to the aperture in microscope's stage 34.

Focusing of the microscope on a specimen disposed over the aperture in the stage is accomplished by sliding the optical tube to or from within the split sleeve 44. The microscope may include means (not shown) for effecting the fine adjustment or focussing of the optical tube with respect to the microscope stage. That means is shown in my copending U.S. patent application Ser. No. 08/663,498, filed on Jun. 14, 1996, entitled Microscope Assembly Comprising A Supported And Movable Specimen Wheel And Fine Adjustment Means, whose disclosure is incorporated by reference herein. That fine adjustment means basically comprises a pair of inclined cam surfaces, and a cam follower or pin. The cam surfaces are formed on the upper edge of the split sleeve contiguous with the split in the sleeve and each extend upward at a slight incline. The cam follower is secured to the outer surface of the optical tube and is arranged to be brought into engagement with either edge surface by sliding the optical tube downward toward the microscope stage to grossly focus the microscope, and then by rotating the optical tube about its longitudinal axis so that the cam follower slides along the engaged inclined cam surface, either up or down (as the case may be), to effect the fine focusing of the microscope.

In order to make the microscope more interesting to young persons, the polarizing accessory system 20 is provided so that specimens best visible under polarized light can be examined. As mentioned earlier that system 20 basically comprises a pair of polarizing filter units 24 and 26. The unit 26 serves as the lower polarizing "filter" of the system and is arranged to be disposed between the light source and the specimen-holding slide, while the unit 24 serves as the "analyzer" and is arranged to be disposed between the microscope's eyepiece lens and the viewer's eye. To that end, the polarizing unit 26 is arranged to be disposed on the microscope stage, over the light aperture 50. The unit 26 is configured to hold up to two conventional specimen-bearing slides thereon, and thus can be thought of as a tray-like unit. The other polarizing unit, i.e., unit, 24 is arranged to be disposed on the eyepiece assembly of the microscope's optical tube in such a manner that it can be readily rotated to any angular orientation with respect thereto to adjust the degree of polarization produced by the system 20.

The polarizing unit 26 basically comprises a planar, rectangular, peripheral frame 58 having a pair of long side rails 60 and a pair of short end rails 62, and a planar filter element 64. In particular, the filter 64 comprises a thin, e.g., 0.01 inch (0.254 mm), rectangular planar sheet or film of a conventional polarizing filter mounted within the frame 58. The frame itself is preferably formed as an integral unit by bonding together two sheets of 24 point cardboard, with the polarizing filter sheet 64 interposed therebetween. Other materials than cardboard, e.g., plastics, can be used for the frame 58. In any case, it is preferred that the spacing between the inner edges of the end rails be equal to the width of a conventional glass slide, i.e., 3 inches (7.62 cm), while the spacing between the inner edges of the side rails be equal to the height of two conventional slides, i.e., 2 inches (5.08 cm). Thus, as can be seen in FIG. 3 up to two conventional slides 1010' can be placed within the area bounded by the frame 58 and supported on the filter sheet 64 (although only one such slide is shown in FIG. 1). This feature is of considerable importance in that it enables children or other users to preload the polarizing element 26 with one or more slides 10 so that such slides can be held relatively securely therein to facilitate viewing (as will be described later), and with the sharp edges of the slide(s) abutting the frame 58.

The other polarizing unit, i.e., the "analyzer" 24, basically comprises a complementary polarizing filter sheet 66 housed in a cup-shaped cap 68. The cup shaped cap basically comprises a tubular sidewall 70 and a planar top wall 72 having a central opening 74 therein. The sidewall can be formed of any suitable material. One preferable material is PVC pipe of $1^1$ $^3/_{16}$ inch (30.16 mm) inside diameter and having a wall thickness of $^1/_{16}$ inch (1.59 mm) and a height of 1 inch (2.54 cm). The top wall 72 is formed of the same material as the frame 58, e.g., cardboard, and is fixedly secured, i.e., glued, to the upper end of the sidewall 70. The outside diameter of the top wall is $1^5/_8$ inch (41.28 mm) and its central opening 74 is ½ inch (1.27 cm). The filter sheet 66 is of the same construction as the filter sheet 64, is interposed between the two cardboard layers of the top wall 72 and is of a sufficient size to cover the central opening 74, e.g., is slightly greater than ½ inch (1.27 cm) in diameter.

As mentioned earlier, the cup-shaped polarizing unit 24 is arranged to be disposed over the eyepiece assembly 48 at the upper end of the optical tube 30. This is accomplished by merely placing it thereover as shown clearly in FIG. 2. This action generally centers the polarizing filter 66 within the hole 74 over the eyepiece lens. Since the unit 24 merely rests on the top of the eyepiece assembly the unit 24 can be rotated about the central longitudinal axis of the optical tube by merely grasping it between one's fingers and twisting it to the desired angular orientation. This feature is of considerable importance to enable the user, e.g., a young child, to readily adjust the amount of polarization produced.

As should be appreciated from the foregoing in order to view any portion of a specimen, such as crystallized sugar, on the slide 10 under polarized light, the slide 10 (alone or along with another specimen bearing slide) is placed on the polarizing filter sheet 64 within the confines of the frame 58 of the tray-like polarizing unit 26. That unit can then be appropriately positioned by sliding it across the microscope's stage 34 until the desired portion of the specimen on the slide 10 is over the aperture 50 in the stage. The upper (cup-shaped) polarizing unit 24 can then be rotated to any desired rotational position to establish the angular orientation between its polarizing filter 66 and the polarizing filter 64 of the lower polarizing unit 26, whereupon light from the light transmissive rod 32 will pass through the polarizing filter sheet 54 and through the specimen, e.g., the crystallized sugar on the slide 10, into the objective lens assembly, from there through the optic tube to the eyepiece assembly, through the polarizing filter 66 to the viewer's eye. Thus, when the microscope is focused, the viewer will be able to view the color spectrum produced by the polarized light passing through the sugar crystals.

As should be appreciated from the foregoing the polarizing accessory system 20 makes use of two relatively simple and low cost polarizing components. The upper or eye-piece component is easily manipulated (rotatable and removable), even by a child, to enable the user to achieve impressive color displays of specimens under polarized light. The lower or tray-like component is also easily manipulated, and has the advantage of serving as a carrier for one or more conventional slides. Thus, such slides can be readily maneuvered to any desired position on the microscope stage. Moreover, as mentioned earlier the frame may serve to protect the user from being cut or otherwise injured by a sharp edge of the slide.

The system 20 can also be used off of the microscope for polarized examinations of various materials, or for polarized viewing of a vista or a landscape. The components can be used individually for gross examination of certain materials, e.g., folded cellophane, or other thin plastics. Such action is accomplished by merely holding the eyepiece unit 24 or the tray unit 26 up to one's eye and rotating it with respect to the cellophane or plastic.

It must be pointed out at this juncture that the unit 26 can be constructed to hold only a single slide, or more than two slides, as desired. Moreover, the unit 24 can be constructed so that it includes a different cup shaped cap. In fact, the upper polarizing unit may not even make use of a cup-shaped cap, so long as it is constructed so that it can be readily disposed on the upper end of the optical tube and rotated or otherwise moved with respect thereto to adjust the amount of polarization produced.

Without further elaboration the foregoing will so fully illustrate my invention that others may, by applying current or future knowledge, adopt the same for use under various conditions of service.

I claim:

1. A polarizing accessory system for use with a microscope, the microscope comprising an optical tube having an objective lens and an eye-piece lens, a stage having an aperture therein, and light conveying means for conveying light through the aperture to the optical tube, said accessory system comprising a first polarizing unit and a second polarizing unit, said first polarizing unit being arranged to be disposed on the microscope stage over the aperture and comprising a generally planar frame defining a window therein in which a first light polarizing element is located, said window forming a support surface for at least one specimen-holding slide, said slide having a predetermined width, said frame having portions separated by a predetermined distance to establish the width of said window, said width of said window being equal to the width of the slide, whereupon the slide is held in position on said window, said second polarizing unit being arranged to be releasably mounted over the eye-piece lens and adjustable with respect thereto, said second polarizing unit having a second light polarizing element mounted therein.

2. The system of claim 1 wherein said second polarizing unit is cup-shaped, and wherein said second light polarizing element is mounted therein.

3. The system of claim 2 wherein said second polarizing unit is arranged to be freely rotatable with respect to the eyepiece lens.

4. The system of claim 1 wherein said second polarizing unit is arranged to be freely rotatable with respect to the eyepiece lens.

5. The system of claim 1 wherein said window is shaped to accommodate at least two conventional slides therein in a side-by-side array.

* * * * *